(12) United States Patent
Shartzer et al.

(10) Patent No.: US 11,231,012 B1
(45) Date of Patent: Jan. 25, 2022

(54) SYSTEMS AND METHODS FOR CONTROLLING A WIND TURBINE

(71) Applicant: General Electric Renovables Espana, S.L., Barcelona (ES)

(72) Inventors: Samuel Bryan Shartzer, Greenville, SC (US); Scott Charles Evans, Burnt Hills, NY (US); Dhiraj Arora, Rexford, NY (US); Bernard P. Landa, Schenectady, NY (US); Joerg Wanink, Neuenhaus (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/027,789

(22) Filed: Sep. 22, 2020

(51) Int. Cl.
*F03D 7/02* (2006.01)
*F03D 7/04* (2006.01)

(52) U.S. Cl.
CPC ......... *F03D 7/0204* (2013.01); *F03D 7/0224* (2013.01); *F03D 7/045* (2013.01); *F05B 2270/20* (2013.01); *F05B 2270/32* (2013.01); *F05B 2270/329* (2013.01); *F05B 2270/331* (2013.01); *F05B 2270/335* (2013.01)

(58) Field of Classification Search
CPC ...... F03D 7/0204; F03D 7/0224; F03D 7/045; F05B 2270/20; F05B 2270/335; F05B 2270/329; F05B 2270/331; F05B 2270/32
USPC ...................................................... 290/44, 55
See application file for complete search history.

(56) References Cited

U.S. PATENT DOCUMENTS

| | | | |
|---|---|---|---|
| 7,004,724 B2 | 2/2006 | Pierce et al. |
| 7,118,339 B2 | 10/2006 | Moroz et al. |
| 7,883,317 B2 | 2/2011 | Ormel et al. |
| 7,987,067 B2 | 7/2011 | Harrison et al. |
| 8,057,174 B2 | 11/2011 | Scholte-Wassink |
| 8,239,071 B2 | 8/2012 | Lausen |
| 8,269,361 B2 | 9/2012 | Egedal |
| 8,398,369 B2 | 3/2013 | Rebsdprf et al. |

(Continued)

FOREIGN PATENT DOCUMENTS

| | | |
|---|---|---|
| CN | 108448610 A | 8/2018 |
| CN | 109492777 A | 3/2019 |

(Continued)

OTHER PUBLICATIONS

Evans et al., Towards Wind Farm Performance Optimization through Empirical Models, 2014 IEEE Aerospace Conference, Big Sky, MT, Mar. 2014, pp. 1-12.

(Continued)

*Primary Examiner* — Pedro J Cuevas
(74) *Attorney, Agent, or Firm* — Dority & Manning, P.A.

(57) ABSTRACT

A system and method are provided for controlling a wind turbine of a wind farm. Accordingly, a controller determines a performance differential for the wind turbine at multiple sampling intervals of a yaw event. The controller determines a trendline for the wind turbine correlating the performance differential to a deviation of a wind direction at each of the multiple sampling intervals from an first yaw angle. A difference between an angle associated with the vertex of the trendline and the first yaw angle are utilized by the controller to determine a yaw angle offset. The yaw angle offset is used to adjust a second yaw angle of the wind turbine.

20 Claims, 7 Drawing Sheets

(56) References Cited

U.S. PATENT DOCUMENTS

| | | | |
|---|---|---|---|
| 8,529,206 B2* | 9/2013 | Numajiri | F03D 7/0204 416/1 |
| 8,587,140 B2 | 11/2013 | Egedal et al. | |
| 8,712,593 B2 | 4/2014 | Bjertrup et al. | |
| 9,217,416 B2 | 12/2015 | Spruce et al. | |
| 9,261,076 B2 | 2/2016 | Adballah et al. | |
| 9,551,322 B2 | 1/2017 | Ambekar et al. | |
| 9,605,558 B2 | 3/2017 | Perley et al. | |
| 9,606,518 B2 | 3/2017 | Evans et al. | |
| 9,644,612 B2 | 5/2017 | Evans et al. | |
| 9,683,552 B2 | 6/2017 | Tiwari et al. | |
| 9,777,706 B2 | 10/2017 | Couchman et al. | |
| 9,790,921 B2 | 10/2017 | Egedal et al. | |
| 9,822,764 B2 | 11/2017 | Esbensen et al. | |
| 10,041,475 B1 | 8/2018 | Badrinath et al. | |
| 10,132,295 B2 | 11/2018 | Lund et al. | |
| 10,247,170 B2 | 4/2019 | Evans et al. | |
| 10,487,804 B2 | 11/2019 | Evans et al. | |
| 10,956,632 B2* | 3/2021 | Wang | H02J 3/386 |
| 2010/0014969 A1 | 1/2010 | Wilson et al. | |
| 2010/0092292 A1 | 4/2010 | Nies et al. | |
| 2012/0112458 A1* | 5/2012 | Numajiri | F03D 7/024 290/44 |
| 2013/0184838 A1 | 7/2013 | Tchoryk, Jr. et al. | |
| 2014/0003939 A1* | 1/2014 | Adams | F03D 7/0284 416/1 |
| 2015/0152847 A1 | 6/2015 | Guadayol Roig | |
| 2015/0233348 A1 | 8/2015 | Hiremath et al. | |
| 2017/0122289 A1 | 5/2017 | Kristoffersen et al. | |
| 2017/0328346 A1 | 11/2017 | Hales et al. | |
| 2017/0350369 A1 | 12/2017 | Evans et al. | |
| 2017/0350370 A1* | 12/2017 | Son | F03D 80/50 |
| 2018/0003153 A1 | 1/2018 | Damgaard | |
| 2018/0030955 A1 | 2/2018 | Vaddi et al. | |
| 2019/0170119 A1 | 6/2019 | Nielsen | |
| 2020/0210538 A1* | 7/2020 | Wang | G06F 30/20 |
| 2020/0210824 A1* | 7/2020 | Poornaki | G05B 23/0254 |
| 2021/0148331 A1* | 5/2021 | Lin | F03D 17/00 |
| 2021/0232731 A1* | 7/2021 | Wang | H02J 3/386 |

FOREIGN PATENT DOCUMENTS

| | | |
|---|---|---|
| EP | 2048562 B1 | 8/2009 |
| EP | 2213873 A1 | 8/2010 |
| EP | 2518308 A1 | 10/2012 |
| WO | WO2017/211367 A1 | 12/2017 |
| WO | WO2017/211368 A1 | 12/2017 |
| WO | WO2018/121668 A1 | 7/2018 |
| WO | WO2018/198225 A1 | 11/2018 |

OTHER PUBLICATIONS

Evans et al., Wind Farm Performance Validation Through Machine Learning: Sector-wise Honest Brokers, 2015 IEEE Aerospace Conference, Big Sky, MT, 2015, pp. 1-8.

Leahy et al., Diagnosing Wind Turbine Faults Using Machine Learning Techniques Applied to Operational Data, 2016 IEEE International Conference on Prognostics and Health Management, Ottawa, ON Canada, Jun. 20-22, 2016, pp. 1-8. (Abstract Only).

Marvuglia et al., Monitoring of Wind Farms' Power Curves Using Machine Learning Techniques, Applied Energy, vol. 98, Oct. 2012, pp. 574-583. (Abstract Only).

Morshedizadeh et al., Power Production Prediction of Wind Turbines Using a Fusion of MLP and ANFIS Networks, IET Renewable Power Generation, vol. 12, Issue 09, Jul. 9, 2018, pp. 1025-1033.

Ouyang et al., Monitoring Wind Turbines' Unhealthy Status: A Data-Driven Approach, IEEE Transactions on Emerging Topics in Computational Intelligence, Miami, FL, 2018, pp. 1-10.

Toubakh et al., Advanced Pattern Recognition Approach for Fault Diagnosis of Wind Turbines, 2013 12th International Conference on Machine Learning and Applications, 2013, pp. 368-373.

Vaccaro et al., An Adaptive Framework Based on Multi-Model Data Fusion for One-day-Ahead Wind Power Forecasting, Electric Power Systems Research, vol. 81, Issue 03, Mar. 2011, pp. 775-782.

* cited by examiner

SYSTEMS AND METHODS FOR CONTROLLING A WIND TURBINE

FIELD

The present disclosure relates in general to wind turbines, and more particularly to systems and methods for controlling a wind turbine of a plurality of wind turbines of a wind farm via a yaw offset.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

Capturing the kinetic energy of the wind generally includes yawing the nacelle of the wind turbine into the wind. Typically, when the wind turbine is operating below rated power, the wind turbine may produce a maximal amount of power for given environmental conditions when the nacelle and the wind are aligned in parallel. Accordingly, when the wind and the nacelle are misaligned so that the wind's vector intersects the axis of the nacelle, the power production of the wind turbine may be less than the maximal amount.

In order to facilitate the maximal power production of the wind turbine for a given environmental condition, wind turbines are typically equipped with a wind vane or other sensor which may detect the direction of the wind. This information may be utilized to yaw the nacelle in order to bring the nacelle into alignment with the wind. However, this information may lack the desired level of accuracy. For example, the wind vane may be misaligned during installation or following a maintenance procedure.

Additionally, the wind vane may typically be mounted downwind of the rotor. Thus, the interaction of the rotor and the wind may induce a wind direction change downwind of the rotor. Accordingly, the wind vane may be intentionally misaligned and/or a biasing value may be applied to its output. However, the misalignment/biasing may be based on nominal design calculations and may not reflect differences in the rotor and/or other factors. As such, the degree of misalignment/biasing may not result in the desired level of accuracy.

In view of the aforementioned, the art is continuously seeking new and improved systems and methods for controlling a wind turbine of a wind farm which align the nacelle in parallel with the wind direction.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine of a plurality of wind turbines of a wind farm. The method may include determining, via the controller, a performance differential for the wind turbine for multiple sampling intervals of a yaw event. The performance differential may be indicative of a ratio of the monitored performance parameter to an estimated performance parameter for the wind turbine. The method may also include determining, via the controller, a trendline for the wind turbine correlating the performance differential to a deviation of a wind direction at each of the multiple sampling intervals from a first yaw angle for the yaw event. Additionally, the method may include determining, via the controller, a yaw angle offset based on a difference between an angle associated with a vertex of the trendline and the first yaw angle. Also, the method may include adjusting, via the controller, a second yaw angle of the wind turbine based at least in part on the yaw angle offset.

In an embodiment, the method may include receiving, via the controller, an indication of the performance parameter for each wind turbine of a designated subset of the plurality of wind turbines at each of the multiple sampling intervals. The method may also include modeling, via the controller, an expected performance parameter for the wind turbine at each of the multiple sampling intervals based on the received indications of the performance parameter of each wind turbine of the designated subset.

In an additional embodiment, the method may include receiving, via the controller, an indication of a monitored wind direction from an environmental sensor of the wind turbine at each of the multiple sampling intervals of the yaw event. The method may also include receiving, via the controller, an indication of a yaw setpoint from at least a portion of the plurality of wind turbines at least once per yaw event. The method may also include determining, via the controller, a median yaw setpoint based on the received indications. The median yaw setpoint may be indicative of a yaw-event wind direction. The yaw-event wind direction may be the wind direction in axial alignment with the wind turbine for the yaw event. Additionally, the method may include determining, via the controller, a difference between the monitored wind direction at each of the multiple sampling intervals and the first yaw angle. The difference may correspond to the deviation of the wind direction at each of the multiple sampling intervals from the yaw-event wind direction. Further, the method may include determining, via the controller, a performance-parameter-correlation distribution relative to the deviation of the wind direction from the first yaw angle for the yaw event.

In yet a further embodiment, the method may include defining at least a first and a second yaw sector. The method may also include determining a first yaw angle offset for the wind turbine when the wind turbine is in the first yaw sector. Additionally the method may include determining a second yaw angle offset for the wind turbine when the wind turbine is in the second yaw sector. The second yaw angle offset being different than the first yaw angle offset.

In an embodiment, the yaw event may be defined by a period between subsequent yaw setpoint commands received from the controller. The yaw event may include at least five sampling intervals.

In an additional embodiment, the yaw event may have a duration of 60 seconds. Additionally, each sampling interval may occur once every 10 seconds over the duration of the yaw event.

In a further embodiment, the method may be repeated for each yaw event occurring over a sampling period of at least one month.

In yet a further embodiment, adjusting the yaw angle of the wind turbine may include aligning or recalibrating an environmental sensor of the wind turbine.

In an embodiment, the adjusting of the yaw angle of the wind turbine may be accomplished following the installation of the wind turbine or the environmental sensor and/or a maintenance or service activity.

In a further embodiment, the method may include establishing an alignment test interval for the wind turbine. The method may also include determining the yaw angle offset in accordance with a test schedule as defined by the alignment test interval in order to detect a drift in the alignment of the environmental sensor or the wind turbine.

In yet a further embodiment, the performance parameter may be a power output.

In an embodiment, the performance parameter may be a first performance parameter. The method may also include determining, via the controller, a second performance differential for the wind turbine at each of the multiple sampling intervals of the yaw event. The second performance differential may be indicative of a ratio of a monitored second performance parameter to an estimated second performance parameter for the wind turbine. Additionally, the trendline may be a three-dimensional trendline correlating the first performance differential and the second performance differential to the deviation of the wind direction at each of the multiple sampling intervals from the first yaw angle.

In an additional embodiment, the second performance parameter may include a tip speed ratio, a pitch setpoint, a yawing moment, wind speed, turbulence intensity and/or a bending moment.

In another aspect, the present disclosure is directed to a system for controlling a wind turbine of the plurality of wind turbines of a wind farm. The system may include a yaw drive mechanism for yawing the wind turbine and a controller communicatively coupled to the plurality wind turbines. The controller may include at least one processor configured to perform a plurality of operations. The plurality of operations may include any of the methods, steps and/or/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
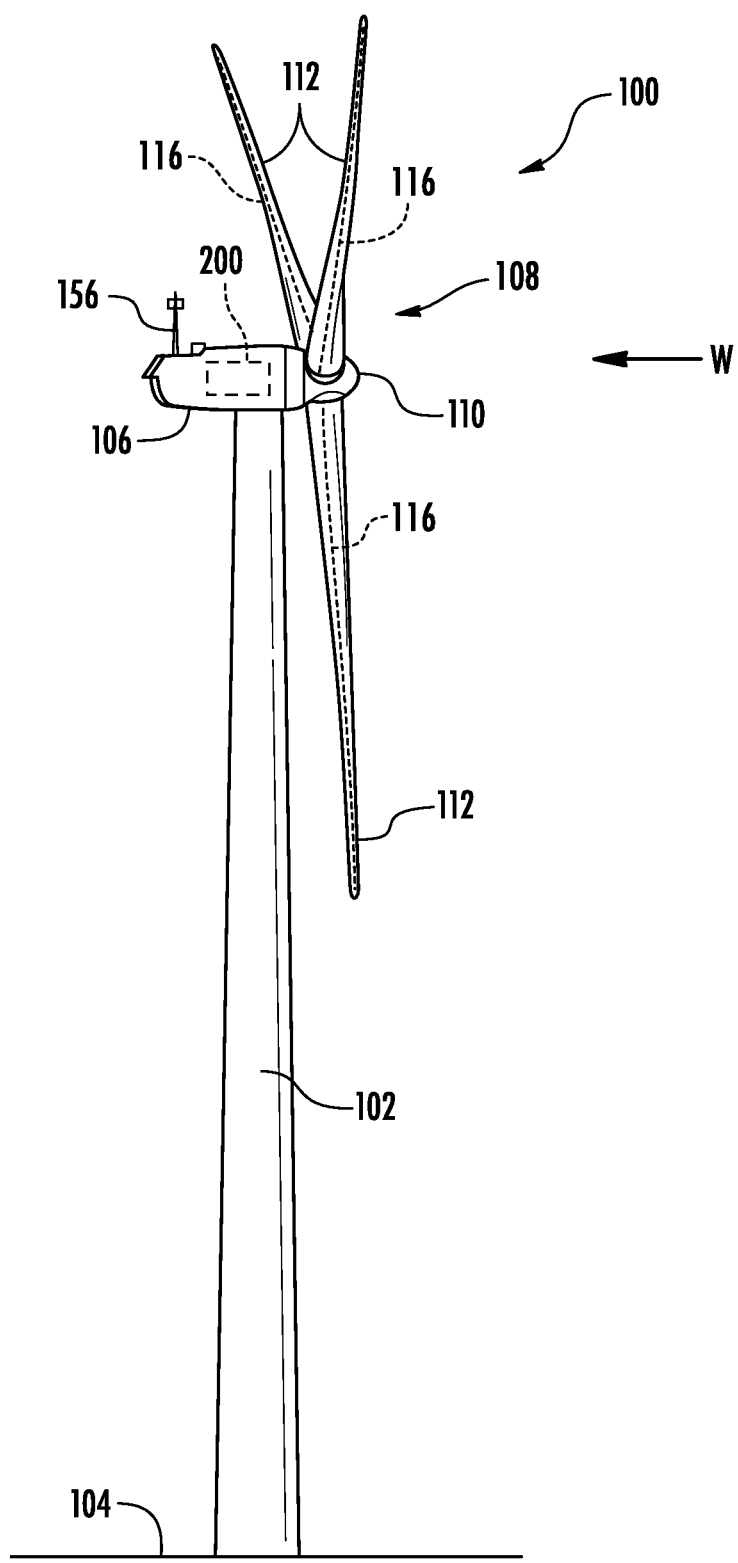
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine that may be part of a wind farm. In particular, the present disclosure may include systems and methods which facilitate the establishment of a yaw angle offset in order to adjust a yaw angle of the wind turbine. More specifically, the present disclosure may include estimating a performance parameter for a subject wind turbine of the wind farm based on performance parameters of a designated subset of wind turbines of the wind farm at multiple sampling intervals. This estimated performance parameter may be correlated with a monitored performance parameter for the subject wind turbine. Accordingly, a ratio of the monitored performance parameter to the estimated performance parameter may be calculated to determine a performance differential.

The wind turbines of the wind farm may receive yaw setpoint commands at a yaw event. The yaw setpoint commands may orient the axis of the wind turbines parallel to the wind direction. Due, at least in part, to the amount of power consumed in yawing the nacelle of the wind turbine, the yaw event may be a fixed period of time, such as 60 seconds. Accordingly, the wind direction may deviate from the direction parallel to the axis of the wind turbine during the yaw event and become misaligned with the wind turbine. However, the deviations of the wind from the axially aligned orientation may be recorded by the wind turbine at a number of sampling intervals during the yaw event. For example, each yaw event may include at least five sampling intervals.

Thus, a controller may correlate the performance differential to the deviations in wind direction at each sampling interval during the yaw event. Using such correlations, the controller may determine a trendline for the wind turbine. The trendline may reflect variations in the ratio between the monitored performance and the estimated performance based on the perceived wind direction. A vertex of the trendline may indicate a perceived wind direction at which the monitored performance parameter most closely coincides with the estimated performance parameter maxima. If the wind turbine is properly aligned to the wind direction, the vertex may occur at the first yaw angle.

The vertex occurring at the first yaw angle may be due to the fact that the designated subset of wind turbines may maximize their respective performance parameters, and therefore the estimated performance parameter, when aligned with the wind at the yaw angle for the yaw event. As such, a vertex of the trendline which is offset from the first yaw angle may indicate a misalignment of the wind turbine to the wind. In other words, the shifted vertex may indicate that when the controller of the wind turbine perceives that the wind turbine is parallel to the wind, the wind turbine may actually be offset by a number of degrees from aerodynamic alignment with the wind, which may be the yaw angle at which optimal power may be produced. Therefore, when the wind is perceived to deviate from the reciprocal of the yaw angle, the wind may actually come into parallel alignment with the axis of the wind turbine. This may result in the wind turbine having a performance parameter most closely correlated to the estimated performance parameter.

The difference in degrees between the perceived wind angle associated with the vertex and the first yaw angle may represent a yaw angle offset. The yaw angle offset may be utilized to adjust the yaw angle of the wind turbine. This adjustment may occur, for example, when the wind turbine or the environmental sensor are installed, maintained, or serviced. For example, the adjustment may include biasing the sensor measurement of the installed anemometer or wind vane or physically rotating the sensor achieve the yaw angle offset determined using the systems and methods described herein.

It should be appreciated that utilizing the designated subset of wind turbines to develop the estimated performance parameter may preclude a requirement that the wind velocity be measured. This may reduce the sensor requirements, and therefore costs, for the wind farm. For example, the utilization of the estimated performance parameter instead of wind speed may eliminate a requirement for a meteorological mast, a lidar, or other sensor system disposed within the wind farm.

It should further be appreciated that the utilization of the performance differential as opposed to a direct measurement of the performance parameter may reduce the number of variables which must be accounted for by the control system. For example, calculations based on the power output of the wind turbine may be subject to fluctuations in wind velocity. This may, thus, require the monitoring of wind velocity and make it more difficult to determine whether the power variations at the multitude of sampling intervals for the yaw event are due to the deviation of the wind direction or due to deviations in wind velocity.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200 configured as a turbine controller centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
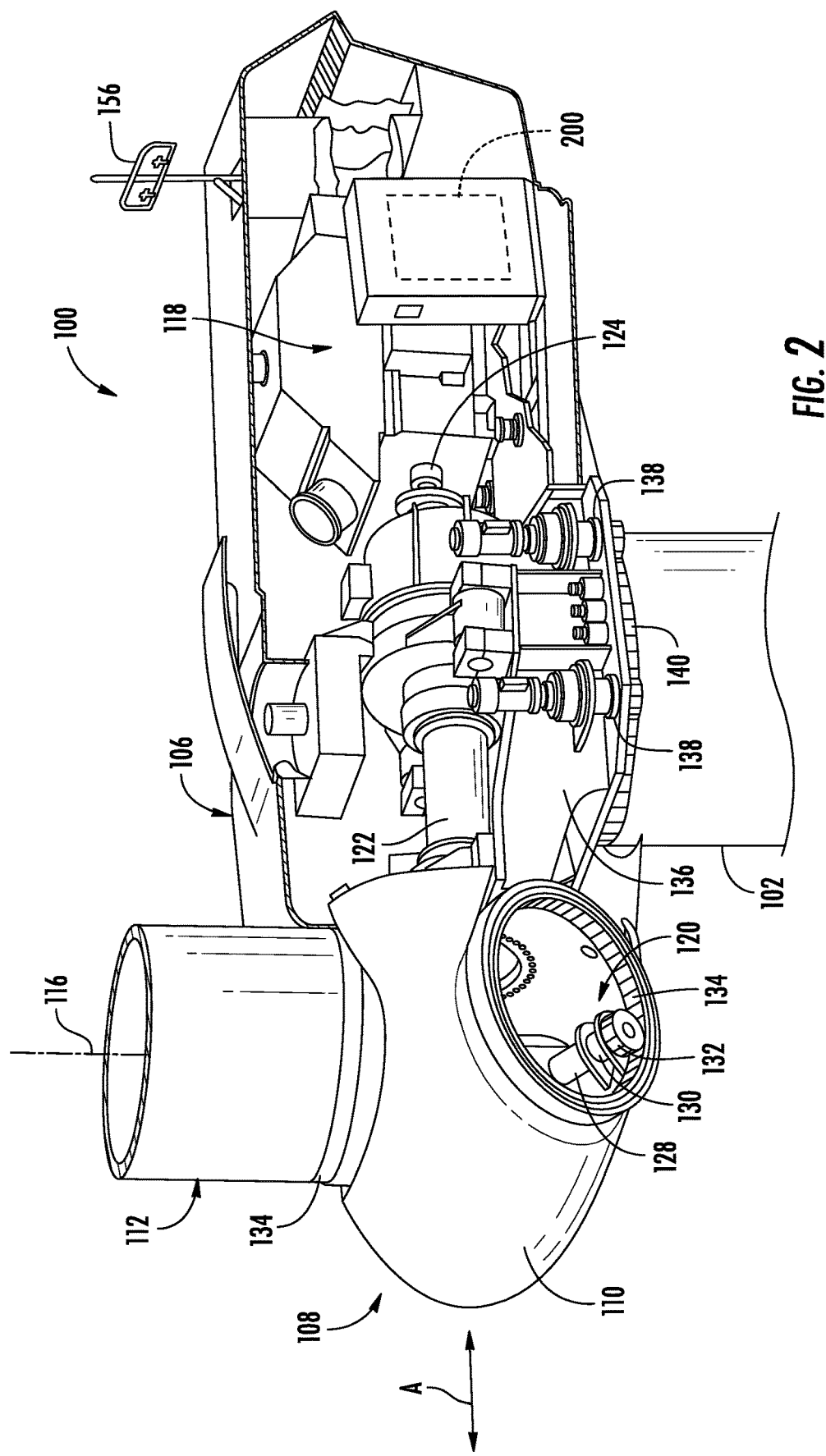
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller 200. Further, each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100). It should be appreciated that the controller 200 may direct the yawing of the nacelle 106 and/or the pitching of the rotor blades 112 so as to aerodynamically orient the wind turbine 100 relative to a wind(W) acting on the wind turbine 100, thereby facilitating power production.

Figure 3:
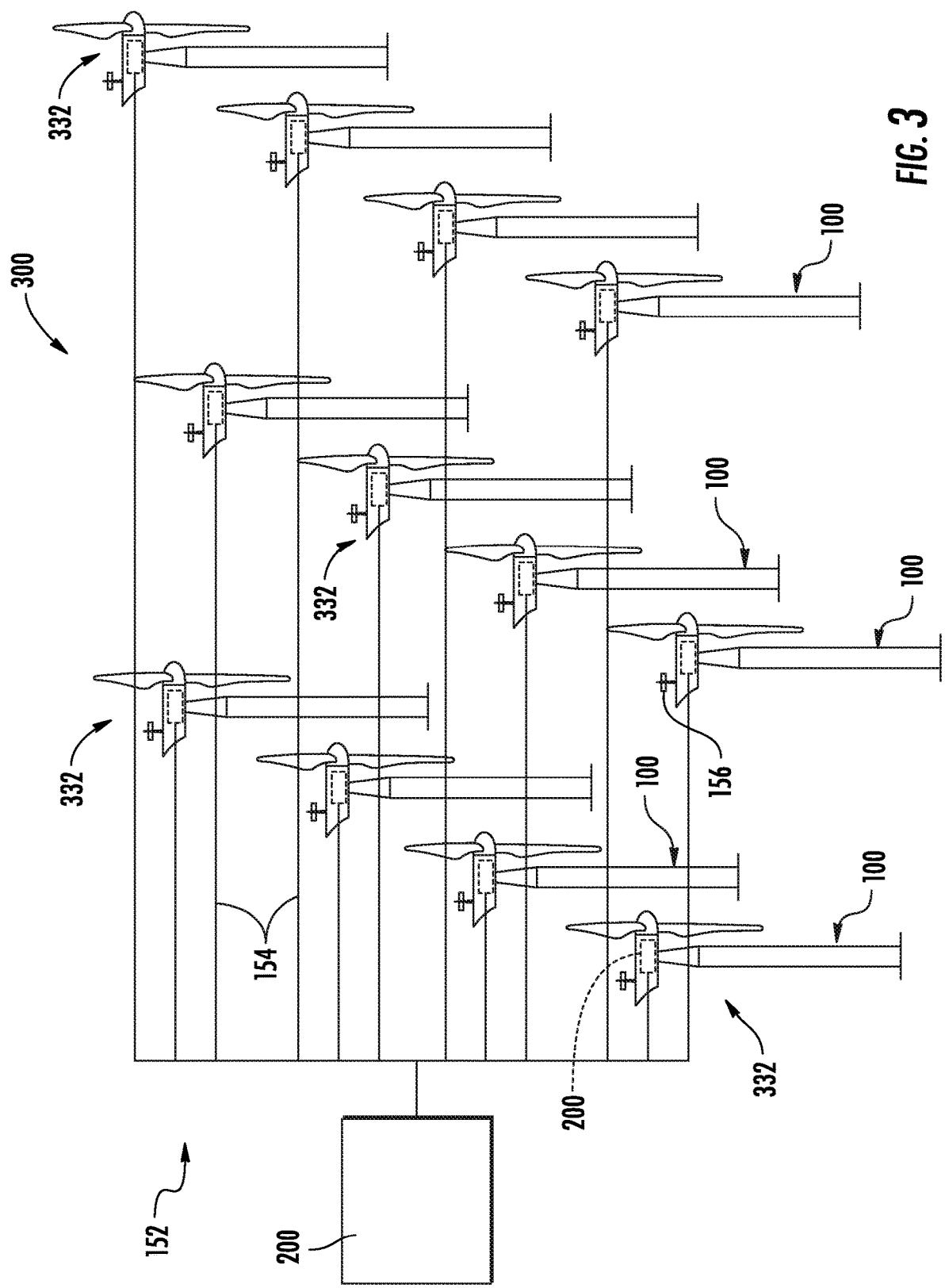
FIG. 3 illustrates a schematic diagram of one embodiment of a wind farm having a plurality of wind turbines according to the present disclosure.

Referring now to FIG. 3, a schematic view of a wind farm 152 according to the present disclosure is illustrated. As shown, the wind from 152 may include a plurality of the wind turbines 100 described herein and the controller 200 configured as a farm controller. For example, as shown in the illustrated embodiment, the wind farm 152 may include twelve wind turbines 100. However, in other embodiments, the wind farm 152 may include any other number of wind turbines 100, such as less than twelve wind turbines 100 or greater than twelve wind turbines 100. In one embodiment, the controller(s) 200 may be communicatively coupled via a wired connection, such as by connecting the controller(s) through suitable communicative links 154 (e.g., a suitable cable). Alternatively, the controller(s) may be communicatively coupled through a wireless connection, such as by using any suitable wireless communications protocol known in the art.

In several embodiments, the wind farm 152 may include a plurality of environmental sensors 156 for monitoring a wind profile of the wind (W) affecting the wind farm 152, and thereby the wind turbines 100. The environmental sensor 156 may be configured for gathering data indicative of at least one environmental condition. The environmental sensor 156 may be operably coupled to the controller 200. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind direction, wind speed, wind shear, wind gust, wind veer, atmospheric pressure, pressure gradient and/or temperature. In at least one embodiment, the environmental sensor(s) 156 may be mounted to the nacelle 106 at a location downwind of the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions at each wind turbine 100 to be monitored individually by the respective turbine controllers and collectively by the farm controller. However, it should be appreciated that the utilization of the systems and methods disclosed herein may preclude a requirement for the environmental sensor(s) 156 to monitor certain environmental conditions, such as wind speed, in order to determine a yaw offset for the wind turbine 100

Figure 4:
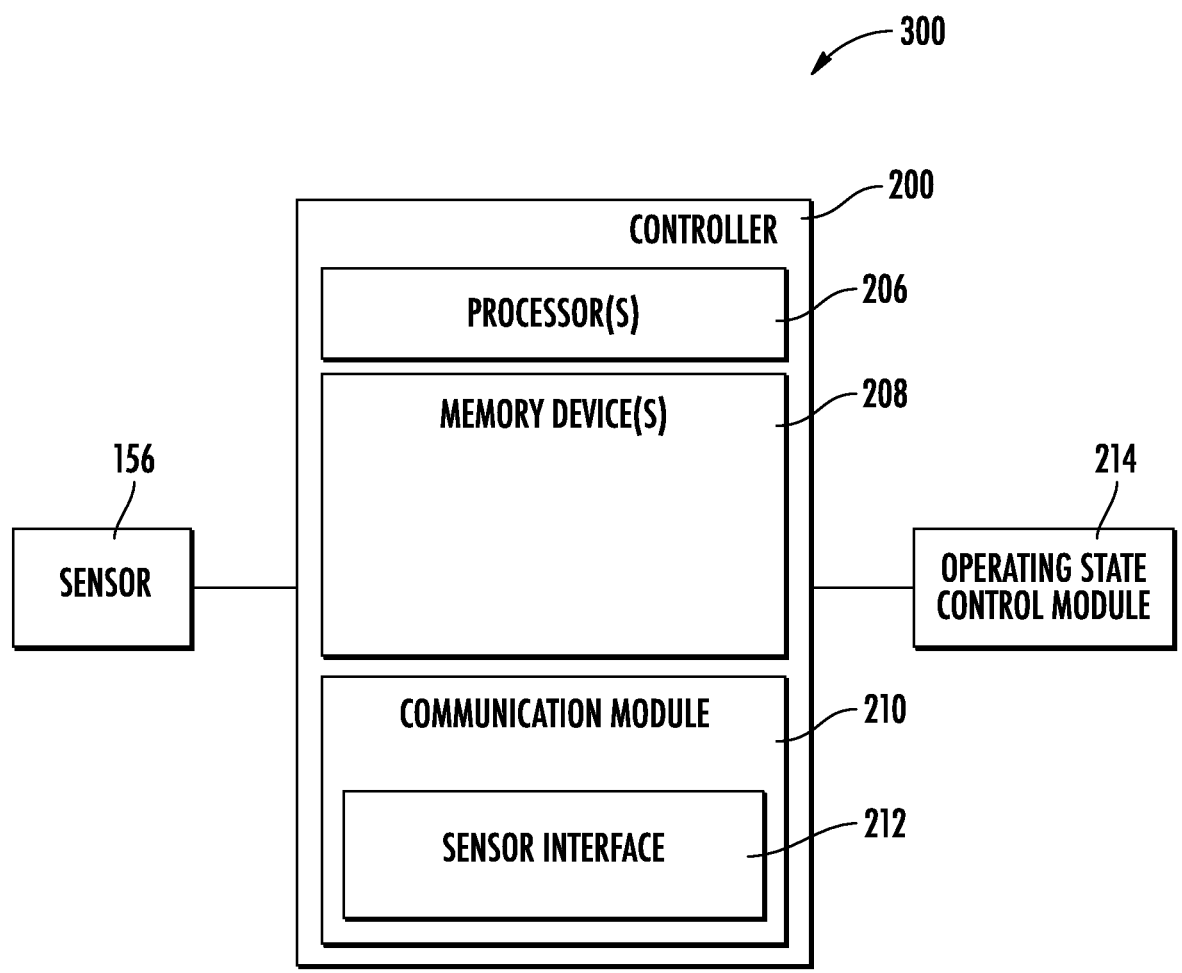
FIG. 4 illustrates a schematic diagram of one embodiment of a controller according to the present disclosure.

Referring now to FIGS. 3-7, wherein various aspects of multiple embodiments of a system 300 for controlling the wind turbine 100 according to the present disclosure are presented. As shown particularly in FIG. 4, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the wind turbines 100, and components thereof. Further, the communications module 210 may include a sensor interface 212 (e.g., one or more analog-to-digital converters) to permit signals transmitted from one or more sensors, such as the environmental sensor(s) 156 to be converted into signals that can be understood and processed by the processors 206. It should be appreciated that the sensors may be communicatively coupled to the communications module 210 using any suitable means. For example, as shown in FIG. 4, the sensors may be coupled to the sensor interface 212 via a wired connection. However, in other embodiments, the sensors may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, controlling the wind turbine 100 of the plurality of wind turbines 100 of the wind farm 152 as described herein, as well as various other suitable computer-implemented functions.

Figure 5:
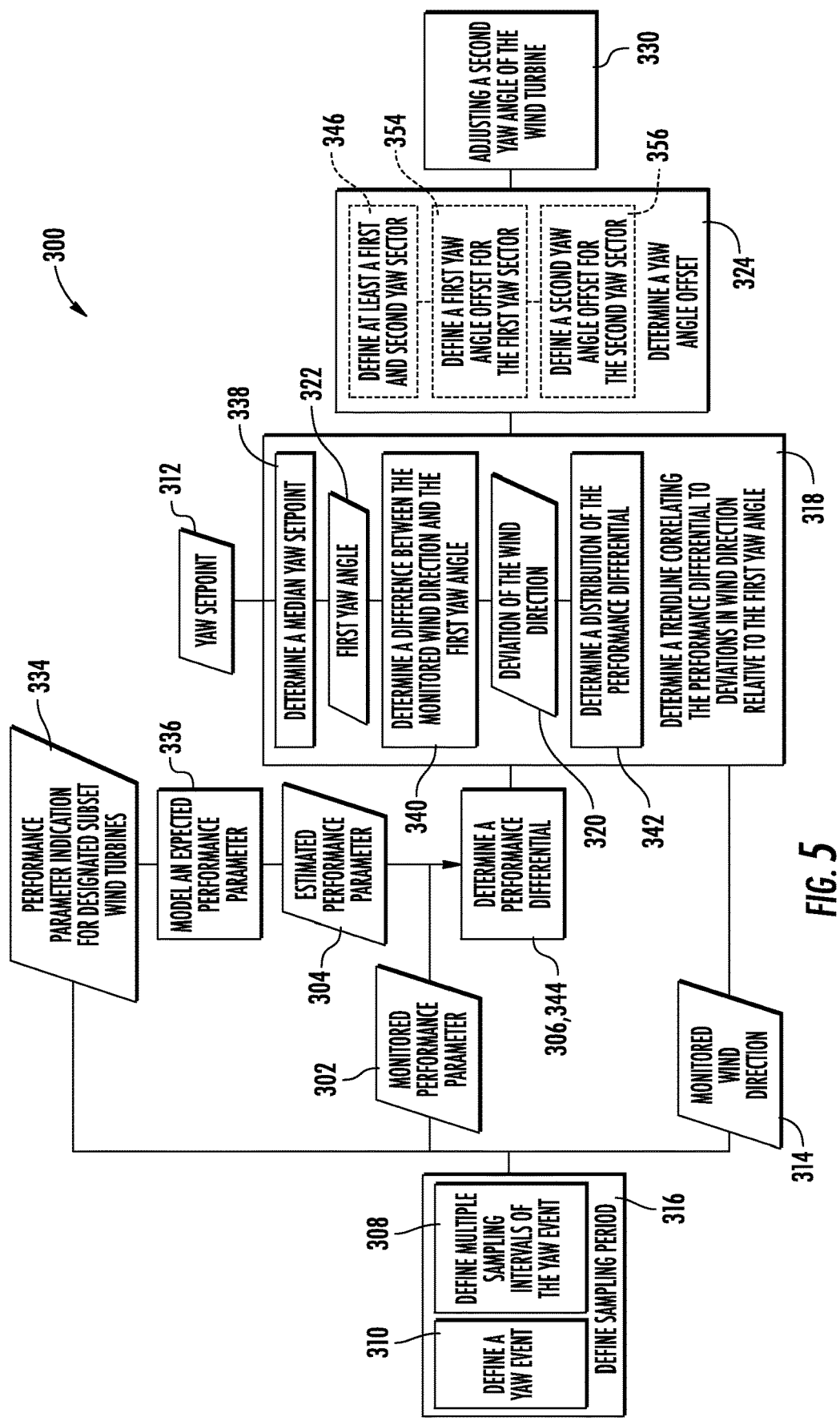
FIG. 5 illustrates a schematic diagram of one embodiment of a control logic of a system for operating a wind turbine according to the present disclosure.

Referring particularly to FIG. 5, in an embodiment, the controller 200 of the system 300 may be configured to receive a monitored performance parameter 302 and an estimated performance parameter 304 for the wind turbine 100 at multiple sampling intervals 308 of a yaw event 310. Based on the performance parameters 302, 304, the controller 200 may determine a performance differential 306 for the wind turbine 100 at the multiple sampling intervals 308. The performance differential 306 may be indicative of a ratio of, or difference, between, the monitored performance parameter 302 to the estimated performance parameter 304. For example, the controller 200 may determine the percentage of the estimated performance parameter 304 actually produced/developed by the wind turbine at the corresponding sampling interval 308.

The performance parameter may, in an embodiment, be a performance parameter of the wind turbine 100 which is subject to monitoring. For example, in an embodiment, the performance parameter may comprise the power outputs of the wind turbines 100 of the wind farm 152. In an additional embodiment, the performance parameter may be a tip speed ratio, a pitch setpoint, a yawing moment, and/or a bending moment. It should be appreciated that the utilization of the power production of the wind turbines 100 of the wind farm 152 may be particularly advantageous in that the measurement of the power output is employed in multiple control schemes relating to the control of the wind turbines 100 and/or the wind farm 152. Therefore, indications of the power production of the wind turbines 100 may be reliable and may be readily available to the controller 200.

In an embodiment, the yaw event 310 may be defined by a period between subsequent yaw setpoint commands received from the controller 200. For example, because of the power consumption associated with the activation of the yaw drive mechanism 138, yaw setpoint commands 312 may be transmitted by the controller 200 at a set interval. In an embodiment, this interval may have a duration of 60 seconds. Accordingly, the wind turbine 100 may receive the yaw setpoint command 312 and the nacelle 106 may be rotated into aerodynamic alignment with the wind (W) (e.g., aligning the axis (A) of the wind turbine 100 parallel to the wind (W)) at a first yaw angle 322. In such an embodiment, the rotation of the nacelle 106 may remain unchanged at the first yaw angle 322 during the yaw event 310 (e.g. 60 seconds) regardless of deviations of the wind away from aerodynamic alignment.

In an embodiment, the period between subsequent yaw setpoint commands 312 may include multiple sampling intervals 308. At each sampling interval 308, the controller 200 may receive indications corresponding to the performance of the wind turbine 100 in response to the environmental conditions. For example, at each sampling interval 308 of the multiple sampling intervals, the controller 200 may receive the monitored performance parameter 302, the estimated performance parameter 304, and/or a monitored wind direction 314. In an embodiment, each yaw event 310 may include at least five sampling intervals 308. For example, in an embodiment each sampling interval 308 may occur once every 10 seconds over the duration of the yaw event 310. Accordingly, in such an embodiment, the controller 200 may be updated six times in between yawing events. Therefore, variations in the wind direction may be detected but not reacted to. Thus, the collection of the parameters at each sampling interval 308 during the corresponding yaw event 310 may serve as a test sequence for the controller 200 without necessitating a deviation from normal wind turbine 100 operations.

In an embodiment, the method disclosed herein may be repeated for each yaw event 310 occurring over a sampling period 316. The sampling period 316 may have a duration of at least one month (e.g. 30 days)). In an additional embodiment, the sampling period 316 may be greater than five months (e.g. six months). In an embodiment wherein the sampling period 316 is greater than five months, the system 300 may include more than 500,000 sampling intervals 308 per wind turbine 100. It should be appreciated that the more than 500,000 sampling intervals 308 may permit the accurate detection of patterns and/or deviations from patterns which may not be accurately discernible at a lower number of sampling intervals.

Figure 7:
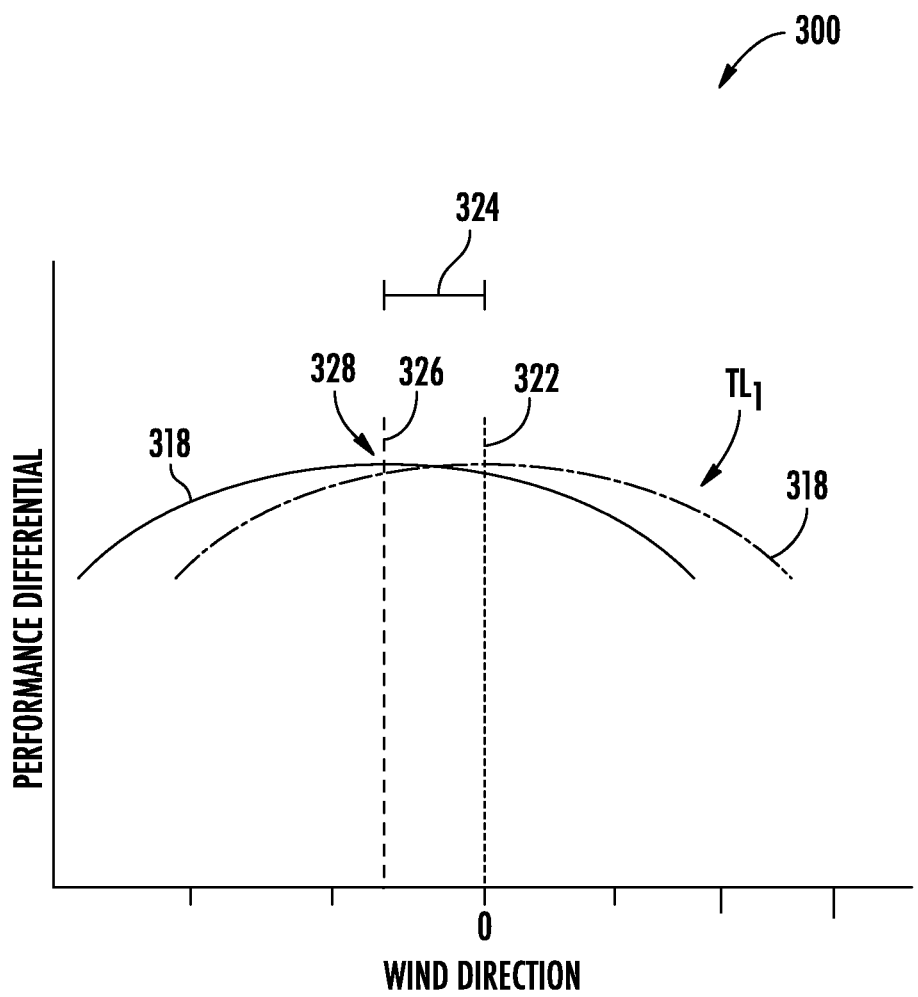

As depicted graphically in FIG. 7, in an embodiment, the controller 200 may determine a trendline 318 for the wind turbine 100, which correlates the performance differential 306 to a deviation of the wind direction 320 at each of the multiple sampling intervals 308. The deviation of the wind direction 320 may be a deviation relative to a first yaw angle 322. The first yaw angle 322 may correspond to a wind direction which is parallel to the axis (A) of the wind turbine 100 for the yaw event 310. For example, the first yaw angle 322 may be the angle to which the nacelle is yawed in response to the yaw setpoint command 312 at the origination of the yaw event 310. In other words, the reciprocal of the first yaw angle may be the direction of the wind (W) at the initiation of the yaw event 310. It should be appreciated that the trendline 318 may, in an embodiment, be determined by the controller 200 via a polynomial expression.

Referring still to FIG. 7, the controller 200 may, in an embodiment, utilize the trendline 318 to determine a yaw angle offset 324. The yaw angle offset 324 may be a difference between an angle 326 associated with the vertex 328 of the trendline 318 and the first yaw angle 322. In an embodiment, such as depicted by the dashed trendline ($TL_1$), wherein the vertex 328 aligns with the first yaw angle 322, the yaw angle offset 324 may be zero degrees.

It should be appreciated that the vertex 328 may correspond to the wind direction wherein the correlation between the monitored performance parameter 302 and the estimated performance parameter 304 is maximal. Accordingly, the vertex 328 may indicate an aerodynamic alignment of the nacelle 106 to the wind (W). For example, the vertex 328 may, in an embodiment, depict the angle of the nacelle 106 relative to the wind (W) at which the wind turbine 100 is producing the full estimated performance parameter 304 (e.g., is actually producing the estimated amount of power).

As depicted in FIG. 5, in an embodiment, the controller 200 of the system 300 may be configured to adjust a second yaw angle 330 of the wind turbine 100 based, at least in part, on the yaw angle offset 324. The second yaw angle 330 may correspond to the angle to which the nacelle 106 is yawed in response to a yaw setpoint command 312 incorporating the yaw angle offset 324. In an embodiment, the adjustment of the second yaw angle 330 may correspond to the introduction of a biasing value to the controller 200. In a further embodiment, the adjustment may correspond to an aligning or recalibration of the environmental sensor(s) 156 of the wind turbine 100. The adjustment may, in an embodiment, be accomplished following the installation of the wind turbine 100 or the environmental sensor 156. In an additional embodiment, the adjustment may be accomplished following a maintenance or service activity on the wind turbine 100. For example, the adjustment may include physically rotating the wind direction sensor and/or introducing a biasing factor into the control system for the wind turbine 100.

In an additional embodiment, adjusting the second yaw angle 330 of the wind turbine 100 may include establishing an alignment test interval for the wind turbine 100. The alignment test interval may define a test schedule for the wind turbine 100. Accordingly, the yaw angle offset may be determined in accordance with the test schedule in order to detect a drift in the alignment of the environmental sensor(s) 156 and/or the wind turbine 100.

In an embodiment, the controller 200 may designate a subset 332 of the plurality of wind turbines 100. The controller 200 may then receive an indication of the performance parameter 334 for each wind turbine of the designated subset 332 at each of the multiple sampling intervals 308. In at least one embodiment, the controller 200 may select the designated subset 332 of the plurality of wind turbines 100 based on a power production profile for each of the designated wind turbines 100. For example, in an embodiment, the designated subset 332 may be the wind turbine(s) 100 having a demonstrated affinity for power generation under the prevailing conditions. Alternatively, the designated subset 332 may have an average power generation capability relative to the plurality of wind turbines 100. It should be appreciated that selecting a designated subset 332 having an average, or below average power generation capability for the prevailing conditions, may ensure that a power generation level from the designated subset 332 is foreseeably achievable by other wind turbines 100 of the wind farm 152.

In an additional embodiment, the designated subset 332 may include wind turbines 100 positioned in particularly advantageous or disadvantaged locations relative to the wind (W) affecting the wind farm 152. For example, the designated subset 332 may include wind turbine(s) 100 located at the point of greatest elevation of the wind farm 152 and/or along a portion of the perimeter of the wind farm 152 upwind of other wind turbines 100. Alternatively, the designated subset 332 may be in a disadvantaged position, such as in a wind shadow, or other region of disturbed wind flow. Selecting wind turbines 100 which are in a disadvantaged position may result in the designated subset 332 having a power generation capability which is foreseeably achievable by other wind turbines 100 in more advantageous positions.

In an embodiment, the controller 200 may model an expected performance parameter 336 for the wind turbine 100 at each of the multiple sampling intervals 308 based on the received indications of the performance parameter 334 of each wind turbine 100 of the designated subset 332. The expected performance parameter 336 may correspond to the estimated performance parameter 304 and may, therefore, indicate the anticipated/predicted performance parameter for the specific sampling interval 308 given the wind (W). Additionally, the controller 200 may monitor the actual performance parameter for the wind turbine 100 at each of the multiple sampling intervals 308. It should be appreciated that the modelling may be accomplished using known techniques in the art, such as ensemble forecasting.

Referring still to FIG. 5, in an embodiment, in order to determine the trendline 318, the controller 200 may receive an indication of the monitored wind direction 314 from the environmental sensor 156 of the wind turbine 100 at each of the multiple sampling intervals 308 of the yaw event 310. For example, during the period between yaw setpoint commands 312, wherein the nacelle 106 may be stationary, the environmental sensor 156 may detect wind shifts or oscillations relative to the first yaw angle 322. Being in the period between yaw setpoint commands 312, the controller 200 may record these observations without reacting to the change in wind direction by commanding a yawing action from the yaw drive mechanism 138.

In an embodiment, the first yaw angle 322 may be determined by the controller 200 without a direct measurement of the wind direction. Accordingly, in an embodiment, the controller 200 may receive an indication of the yaw setpoint 312 from at least a portion of the plurality of wind turbines 100 at least once per yaw event 310. For example, in an embodiment, the controller 200 may receive an indication of the yaw direction of each wind turbine 100 of the wind farm 152 relative to a cardinal direction (N). In an embodiment, the controller 200 may determine a median yaw setpoint 338 based on the received indications of the yaw setpoints 312. The median yaw setpoint 338 may be indicative of a yaw-event wind direction, which may be the wind direction in axial alignment (e.g. aerodynamic alignment) with the wind turbine 100 for the yaw event 310. It should be appreciated that determining the first yaw angle 322 via the meeting yaw setpoint 338 and without a direct measurement of the wind direction may preclude errors which may be associated with the alignment/response of any individual wind turbine 100.

The yaw-event wind direction may be considered the prevailing wind direction for the yaw event and may remain unchanged between subsequent yaw setpoint commands 312. Therefore, any wind shift away from the yaw-event wind direction may be considered to be a deviation of the wind direction 320. Accordingly, controller 200 may, at 340, determine a difference between the monitored wind direction 314 at each of the multiple sampling intervals 308 and the first yaw angle 322. The difference may correspond to the deviation of the wind direction 320 at each of the multiple sampling intervals 308 from the yaw event wind direction/first yaw angle 322. Accordingly, in an embodiment, the controller 200 may determine a performance-parameter-correlation distribution 342 relative to the deviation of the wind direction 320 from the first yaw angle 322 for the yaw event 310. The performance-parameter-correlation distribution 342 may serve as a foundation for determining the trendline 318.

In an embodiment, the accuracy of the yaw angle offset 324 may be increased by the utilization of a second performance parameter in addition to the performance parameter 302, 304 discussed above. Accordingly, in an embodiment, the controller may determine a second performance differential 344 for the wind turbine 100 at each of the multiple sampling intervals 308. The second performance differential 344 may be indicative of a ratio of a monitored second performance parameter to an estimated second performance parameter for the wind turbine 100. The inclusion of the second performance parameter may transform the trendline 318 into a three-dimensional trendline correlating the first performance differential 306 and the second performance differential 344 to the deviation of the wind direction 320, at each of the multiple sampling intervals 308, from the first yaw angle 322. In an embodiment, the second performance parameter may include a tip speed ratio, a pitch setpoint, a yawing moment, wind speed, turbulence intensity, and/or a bending moment. It should be appreciated that more than two performance parameters may be utilized to further increase the fidelity of the yaw angle offset 324.

Figure 6:
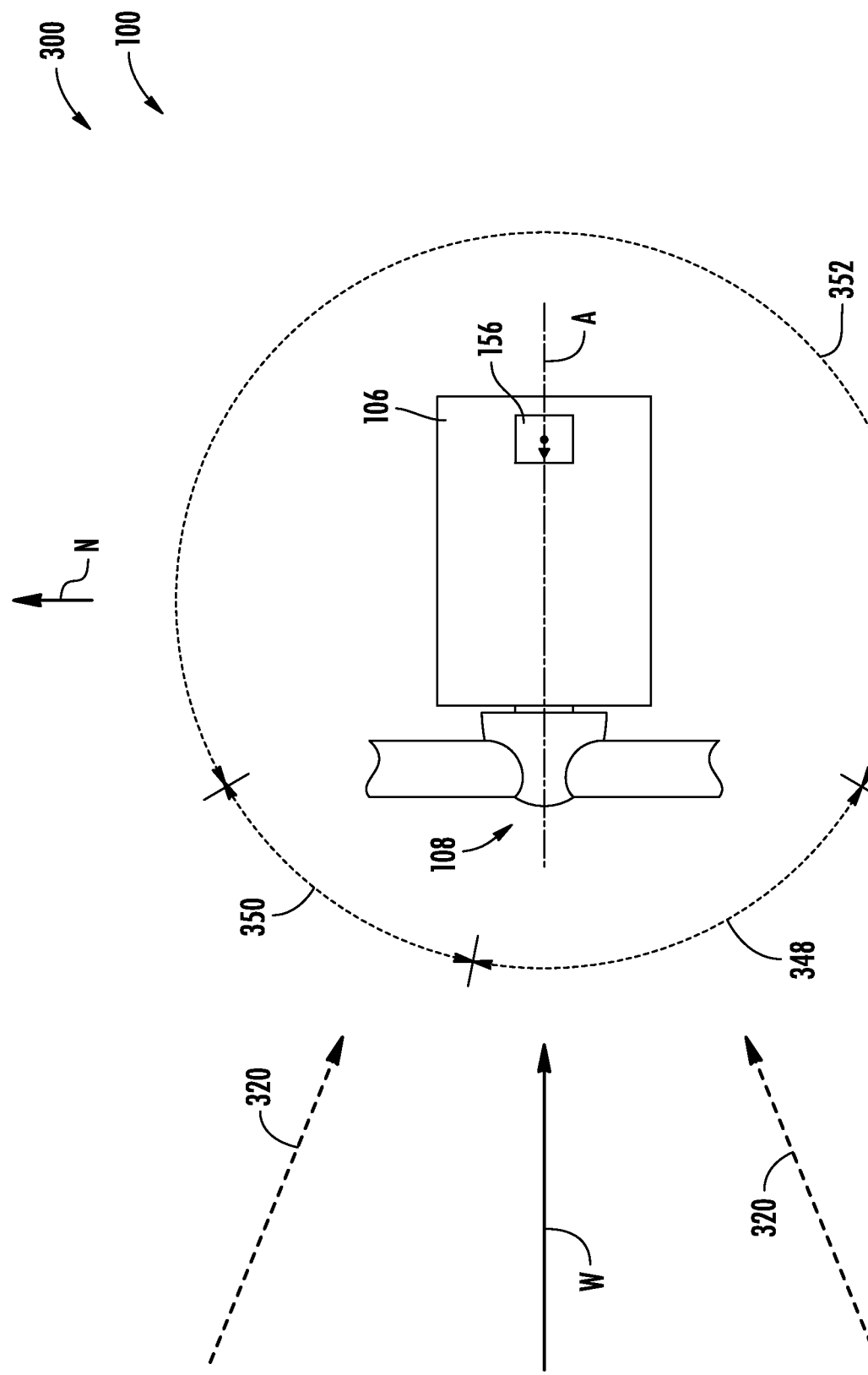
FIG. 6 illustrates a simplified top view of the wind turbine of FIG. 1 according to the present disclosure; and, FIG. 7 illustrates a graphical representation of one embodiment of a trendline for the wind turbine correlating the performance differential to a deviation of a wind direction according to the present disclosure.

Referring particularly to FIG. 6, as depicted at 346, in an embodiment, the system 300 may define at least a first and a second yaw sector 348, 350. In an embodiment, additional yaw sectors 350 may be defined as desired. Each of the yaw sectors 348, 350, 352 may be defined by an arc of rotation of the nacelle 106 relative to a cardinal direction (N).

In an embodiment, the system 300 may determine/define a first yaw angle offset 354 for the wind turbine 100 when the wind turbine 100 is in the first yaw sector 348. Additionally, the system 300 may determine/define a second yaw angle offset 356 for the wind turbine 100 when the wind turbine 100 is in the second yaw sector 350. In an embodiment, the second yaw angle offset 356 may be different than the first yaw angle offset 354. For example, the second yaw angle offset 356 may be greater than the first yaw angle offset 354 an embodiment. It should be appreciated that the utilization of multiple yaw angle offsets in distinct yaw sectors may be necessitated by the layout of the wind farm 152 (e.g. the presence of wake effects from neighboring wind turbines 100) and/or the topography of the wind farm. Thus, the utilization of multiple yaw angle offsets may permit the system 300 to tailor the adjustment of the second yaw angle 330 in consideration of topography, wake effects, and/or other site conditions.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine of a wind farm having a plurality of wind turbines, the method comprising: determining, via a controller, a performance differential for the wind turbine for multiple sampling intervals of a yaw event, the performance differential being indicative of a ratio of a monitored performance parameter to an estimated performance parameter for the wind turbine; determining, via the controller, a trendline for the wind turbine correlating the performance differential to a deviation of a wind direction at each of the multiple sampling intervals from a first yaw angle for the yaw event; determining, via the controller, a yaw angle offset based on a difference between an angle associated with a vertex of the trendline and the first yaw angle; and adjusting, via the controller, a second yaw angle of the wind turbine based, at least in part, on the yaw angle offset.

Clause 2. The method of clause 1, wherein determining the performance differential for the wind turbine further comprises: receiving, via the controller, an indication of a monitored performance parameter for each wind turbine of a designated subset of the plurality of wind turbines at each of the multiple sampling intervals; and modeling, via the controller, an expected performance parameter for the wind turbine at each of the multiple sampling intervals based on the received indications of the monitored performance parameter of each wind turbine of the designated subset.

Clause 3. The method of any preceding clause, wherein determining the trendline for the wind turbine further comprises: receiving, via the controller, an indication of a monitored wind direction from an environmental sensor of the wind turbine at each of the multiple sampling intervals of the yaw event; receiving, via the controller, an indication of a yaw setpoint from at least a portion of the plurality of wind turbines at least once per yaw event; determining, via the controller, a median yaw setpoint based on the received indications, the median yaw setpoint being indicative of a yaw-event wind direction, the yaw-event wind direction being the wind direction in aerodynamic alignment with the wind turbine for the yaw event and corresponding to the first yaw angle; determining, via the controller, a difference between the monitored wind direction at each of the multiple sampling intervals and the first yaw angle, the difference corresponding to the deviation of the wind direction at each of the multiple sampling intervals from the yaw-event wind direction; and determining, via the controller, a distribution of the performance differential relative to the deviation of the wind direction from the first yaw angle for the yaw event.

Clause 4. The method of any preceding clause, wherein determining the yaw angle offset further comprises: defining, at least, a first yaw sector and a second yaw sector; determining a first yaw angle offset for the wind turbine when the wind turbine is in the first yaw sector; and determining a second yaw angle offset for the wind turbine when the wind turbine is in the second yaw sector, the second yaw angle offset being different than the first yaw angle offset.

Clause 5. The method of any preceding clause, wherein the yaw event is defined by a period between subsequent yaw setpoint commands received from the controller, the yaw event comprising at least five sampling intervals.

Clause 6. The method of any preceding clause, wherein the yaw event has a duration of 60 seconds, and wherein each sampling interval occurs once every 10 seconds over the duration of the yaw event.

Clause 7. The method of any preceding clause, wherein the method is repeated for each yaw event occurring over a sampling period of at least one month.

Clause 8. The method of any preceding clause, wherein adjusting the second yaw angle of the wind turbine further comprises aligning or recalibrating an environmental sensor of the wind turbine.

Clause 9. The method of any preceding clause, wherein the adjusting of the yaw angle of the wind turbine is accomplished following at least one of installation of the wind turbine or the environmental sensor or a maintenance or service activity.

Clause 10. The method of any preceding clause, further comprising: establishing an alignment test interval for the wind turbine; and determining the yaw angle offset in accordance with a test schedule as defined by the alignment test interval in order to detect a drift in an alignment of the environmental sensor or the wind turbine.

Clause 11. The method of any preceding clause, wherein the monitored performance parameter comprises a power output.

Clause 12. The method of any preceding clause, wherein the performance differential is a first performance differential, the method further comprising: determining, via the controller, a second performance differential for the wind turbine at each of the multiple sampling intervals of the yaw event, the second performance differential being indicative of a ratio of a monitored second performance parameter to an estimated second performance parameter for the wind turbine, wherein the trendline is a three-dimensional trendline correlating the first performance differential and the second performance differential to the deviation of the wind direction at each of the multiple sampling intervals from the first yaw angle.

Clause 13. The method of any preceding clause, wherein the second performance parameter comprises at least one of a tip speed ratio, a torque, a pitch setpoint, a yawing moment, wind speed, turbulence intensity, and a bending moment.

Clause 14. A system for controlling a wind turbine of a wind farm, the system comprising: a yaw drive mechanism for yawing the wind turbine; and a controller communicatively coupled to the yaw drive mechanism, the controller comprising at least one processor configured to perform a plurality of operations, the plurality of operations comprising: determining a performance differential for the wind turbine at multiple sampling intervals of a yaw event, the performance differential being indicative of a ratio of a monitored performance parameter to an estimated performance parameter or the wind turbine, determining a trendline for the wind turbine correlating the performance differential to a deviation of a wind direction at each of the multiple sampling intervals from a first yaw angle for the yaw event, determining a yaw angle offset as a difference between an angle associated with a vertex of the trendline and the first yaw angle; and adjusting a second yaw angle of the wind turbine based, at least in part, on the yaw angle offset.

Clause 15. The system of any preceding clause, wherein determining the performance differential for the wind turbine further comprises: receiving an indication of the monitored performance parameter for each wind turbine of a designated subset of the plurality of wind turbines at each of the multiple sampling intervals; modeling an expected performance parameter for the wind turbine at each of the multiple sampling intervals based on the received indications of the performance parameter of each wind turbine of the designated subset.

Clause 16. The system of any preceding clause, wherein determining the trendline for the wind turbine further comprises: receiving an indication of a monitored wind direction from an environmental sensor of the wind turbine at each of the multiple sampling intervals of the yaw event; receiving an indication of a yaw setpoint from at least a portion of the plurality of wind turbines at least once per yaw event; determining a median yaw setpoint based on the received indications, the median yaw setpoint being indicative of a yaw-event wind direction, the yaw-event wind direction being the wind direction in aerodynamic alignment with the wind turbine for the yaw event and corresponding to the first yaw angle; determining a difference between the monitored wind direction at each of the multiple sampling intervals and the first yaw angle, the difference corresponding to the deviation of the wind direction at each of the multiple sampling intervals from the yaw-event wind direction; and determining a distribution of the performance differential relative to the deviation of the wind direction from the first yaw angle for the yaw event.

Clause 17. The system of any preceding clause, wherein determining the yaw angle offset further comprises: defining, at least, a first yaw sector and a second yaw sector; determining a first yaw angle offset for the wind turbine when the wind turbine is in the first yaw sector; and determining a second yaw angle offset for the wind turbine when the wind turbine is in the second yaw sector, the second yaw angle offset being different than the first yaw angle offset.

Clause 18. The system of any preceding clause, wherein the yaw event is defined by a period between subsequent yaw setpoint commands received from the controller, the yaw event comprising at least five sampling intervals.

Clause 19. The system of any preceding clause, wherein adjusting the second yaw angle of the wind turbine further comprises aligning or recalibrating an environmental sensor of the wind turbine.

Clause 20. The system of any preceding clause, wherein the monitored performance parameter comprises a power output

What is claimed is:

1. A method for controlling a wind turbine of a wind farm having a plurality of wind turbines, the method comprising:
    determining, via a controller, a performance differential for the wind turbine for multiple sampling intervals of a yaw event, the performance differential being indicative of a ratio of a monitored performance parameter to an estimated performance parameter for the wind turbine;
    determining, via the controller, a trendline for the wind turbine correlating the performance differential to a deviation of a wind direction at each of the multiple sampling intervals from a first yaw angle for the yaw event;
    determining, via the controller, a yaw angle offset based on a difference between an angle associated with a vertex of the trendline and the first yaw angle; and
    adjusting, via the controller, a second yaw angle of the wind turbine based, at least in part, on the yaw angle offset.

2. The method of claim 1, wherein determining the performance differential for the wind turbine further comprises:
    receiving, via the controller, an indication of a monitored performance parameter for each wind turbine of a designated subset of the plurality of wind turbines at each of the multiple sampling intervals; and
    modeling, via the controller, an expected performance parameter for the wind turbine at each of the multiple sampling intervals based on the received indications of the monitored performance parameter of each wind turbine of the designated subset.

3. The method of claim 2, wherein determining the trendline for the wind turbine further comprises:
    receiving, via the controller, an indication of a monitored wind direction from an environmental sensor of the wind turbine at each of the multiple sampling intervals of the yaw event;
    receiving, via the controller, an indication of a yaw setpoint from at least a portion of the plurality of wind turbines at least once per yaw event;
    determining, via the controller, a median yaw setpoint based on the received indications, the median yaw setpoint being indicative of a yaw-event wind direction, the yaw-event wind direction being the wind direction in aerodynamic alignment with the wind turbine for the yaw event and corresponding to the first yaw angle;
    determining, via the controller, a difference between the monitored wind direction at each of the multiple sampling intervals and the first yaw angle, the difference corresponding to the deviation of the wind direction at each of the multiple sampling intervals from the yaw-event wind direction; and determining, via the controller, a distribution of the performance differential relative to the deviation of the wind direction from the first yaw angle for the yaw event.

4. The method of claim 3, wherein determining the yaw angle offset further comprises:

defining, at least, a first yaw sector and a second yaw sector;

determining a first yaw angle offset for the wind turbine when the wind turbine is in the first yaw sector; and determining a second yaw angle offset for the wind turbine when the wind turbine is in the second yaw sector, the second yaw angle offset being different than the first yaw angle offset.

5. The method of claim 1, wherein the yaw event is defined by a period between subsequent yaw setpoint commands received from the controller, the yaw event comprising at least five sampling intervals.

6. The method of claim 5, wherein the yaw event has a duration of 60 seconds, and wherein each sampling interval occurs once every 10 seconds over the duration of the yaw event.

7. The method of claim 5, wherein the method is repeated for each yaw event occurring over a sampling period of at least one month.

8. The method of claim 1, wherein adjusting the second yaw angle of the wind turbine further comprises aligning or recalibrating an environmental sensor of the wind turbine.

9. The method of claim 8, wherein the adjusting of the second yaw angle of the wind turbine is accomplished following at least one of installation of the wind turbine or the environmental sensor or a maintenance or service activity.

10. The method of claim 1, further comprising:

establishing an alignment test interval for the wind turbine; and determining the yaw angle offset in accordance with a test schedule as defined by the alignment test interval in order to detect a drift in an alignment of an environmental sensor or the wind turbine.

11. The method of claim 1, wherein the monitored performance parameter comprises a power output.

12. The method of claim 1, wherein the performance differential is a first performance differential, the method further comprising:

determining, via the controller, a second performance differential for the wind turbine at each of the multiple sampling intervals of the yaw event, the second performance differential being indicative of a ratio of a monitored second performance parameter to an estimated second performance parameter for the wind turbine, wherein the trendline is a three-dimensional trendline correlating the first performance differential and the second performance differential to the deviation of the wind direction at each of the multiple sampling intervals from the first yaw angle.

13. The method of claim 12, wherein the second estimated and monitored performance parameters comprise at least one of a tip speed ratio, a torque, a pitch setpoint, a yawing moment, wind speed, turbulence intensity, and a bending moment.

14. A system for controlling a wind turbine of a wind farm, the system comprising:

a yaw drive mechanism for yawing the wind turbine; and a controller communicatively coupled to the yaw drive mechanism, the controller comprising at least one processor configured to perform a plurality of operations, the plurality of operations comprising:

determining a performance differential for the wind turbine at multiple sampling intervals of a yaw event, the performance differential being indicative of a ratio of a monitored performance parameter to an estimated performance parameter or the wind turbine, determining a trendline for the wind turbine correlating the performance differential to a deviation of a wind direction at each of the multiple sampling intervals from a first yaw angle for the yaw event, determining a yaw angle offset as a difference between an angle associated with a vertex of the trendline and the first yaw angle; and adjusting a second yaw angle of the wind turbine based, at least in part, on the yaw angle offset.

15. The system of claim 14, wherein determining the performance differential for the wind turbine further comprises:

receiving an indication of the monitored performance parameter for each wind turbine of a designated subset of the plurality of wind turbines at each of the multiple sampling intervals; and modeling an expected performance parameter for the wind turbine at each of the multiple sampling intervals based on the received indications of the performance parameter of each wind turbine of the designated subset.

16. The system of claim 15, wherein determining the trendline for the wind turbine further comprises:

receiving an indication of a monitored wind direction from an environmental sensor of the wind turbine at each of the multiple sampling intervals of the yaw event;

receiving an indication of a yaw setpoint from at least a portion of the plurality of wind turbines at least once per yaw event;

determining a median yaw setpoint based on the received indications, the median yaw setpoint being indicative of a yaw-event wind direction, the yaw-event wind direction being the wind direction in aerodynamic alignment with the wind turbine for the yaw event and corresponding to the first yaw angle;

determining a difference between the monitored wind direction at each of the multiple sampling intervals and the first yaw angle, the difference corresponding to the deviation of the wind direction at each of the multiple sampling intervals from the yaw-event wind direction; and determining a distribution of the performance differential relative to the deviation of the wind direction from the first yaw angle for the yaw event.

17. The system of claim 16, wherein determining the yaw angle offset further comprises:

defining, at least, a first yaw sector and a second yaw sector;

determining a first yaw angle offset for the wind turbine when the wind turbine is in the first yaw sector; and determining a second yaw angle offset for the wind turbine when the wind turbine is in the second yaw sector, the second yaw angle offset being different than the first yaw angle offset.

18. The system of claim 14, wherein the yaw event is defined by a period between subsequent yaw setpoint commands received from the controller, the yaw event comprising at least five sampling intervals.

19. The system of claim 14, wherein adjusting the second yaw angle of the wind turbine further comprises aligning or recalibrating an environmental sensor of the wind turbine.

20. The system of claim 14, wherein the monitored performance parameter comprises a power output.

* * * * *